US012572242B2

(12) United States Patent
Rao et al.

(10) Patent No.: US 12,572,242 B2
(45) Date of Patent: Mar. 10, 2026

(54) TOUCH DISPLAY PANEL AND MANUFACTURING METHOD THEREFOR

(71) Applicants: Hefei Visionox Technology Co., Ltd., Hefei (CN); KunShan Go-Visionox Opto-Electronics Co., Ltd., Kunshan (CN)

(72) Inventors: Bo Rao, Hefei (CN); Chung-Chun Lee, Hefei (CN); Xiaoxi Sun, Hefei (CN); Liusong Ni, Hefei (CN)

(73) Assignees: Hefei Visionox Technology Co., Ltd., Hefei (CN); KunShan Go-Visionox Opto-Electronics Co., Ltd., Kunshan (CN)

( * ) Notice: Subject to any disclaimer, the term of this patent is extended or adjusted under 35 U.S.C. 154(b) by 0 days.

(21) Appl. No.: 18/666,313

(22) Filed: May 16, 2024

(65) Prior Publication Data

US 2024/0302926 A1     Sep. 12, 2024

Related U.S. Application Data

(63) Continuation of application No. PCT/CN2024/084420, filed on Mar. 28, 2024.

(30) Foreign Application Priority Data

Dec. 22, 2023     (CN) .......................... 202311793956.7

(51) Int. Cl.
    *G06F 3/044*          (2006.01)
(52) U.S. Cl.
    CPC .................................... *G06F 3/044* (2013.01)
(58) Field of Classification Search
    CPC ............... G06F 3/0412; G06F 3/04166; G06F 3/04184; G06F 3/044; G06F 3/0443
    See application file for complete search history.

(56) References Cited

U.S. PATENT DOCUMENTS

2013/0342479 A1* 12/2013 Pyo .......................... G06F 3/044
                                                                345/173
2016/0349899 A1* 12/2016 Hwang ................. H10K 50/822
                        (Continued)

FOREIGN PATENT DOCUMENTS

CN          104835454 A      8/2015
CN          105992994 A     10/2016
                (Continued)

OTHER PUBLICATIONS

PCT International Search Report for International Application No. PCT/CN2024/084420 dated Sep. 3, 2024.
                (Continued)

*Primary Examiner* — Hong Zhou
(74) *Attorney, Agent, or Firm* — Kilpatrick Townsend & Stockton LLP

(57)          ABSTRACT

Disclosed are a touch display panel, a manufacturing method therefor. The touch display panel includes: a substrate, a light-emitting layer, a plurality of isolation structures, and a time-sharing control module. The light-emitting layer is provided on a side of the substrate and includes a plurality of light-emitting units. The light-emitting unit includes a first electrode. The plurality of isolation structures are configured to define a plurality of isolation opening. The light-emitting unit is provided in the isolation opening, and adjacent light-emitting units are isolated by the isolation structure. The first electrode is electrically connected to the isolation structure. The time-sharing control module is configured to control a corresponding isolation structure to receive a touch signal or a power signal in a time division mode. Thus, there is no need to add an additional touch electrode film layer to achieve touch function of the touch display panel.

17 Claims, 5 Drawing Sheets

(56) References Cited

U.S. PATENT DOCUMENTS

| 2018/0210608 A1* | 7/2018 | Park | G06F 3/0418 |
|---|---|---|---|
| 2020/0266246 A1* | 8/2020 | Bok | G06F 3/0412 |
| 2022/0326796 A1* | 10/2022 | Tabatake | G06F 3/04166 |
| 2023/0292555 A1* | 9/2023 | Takayama | H10K 59/879 |

FOREIGN PATENT DOCUMENTS

| CN | 104765501 B | 1/2018 |
|---|---|---|
| CN | 111210732 A | 5/2020 |
| CN | 114327108 A | 4/2022 |
| CN | 116600612 A | 8/2023 |
| KR | 1020220006781 A | 1/2022 |

OTHER PUBLICATIONS

PCT Written Opinion for International Application No. PCT/CN2024/084420 dated Sep. 3, 2024.

* cited by examiner

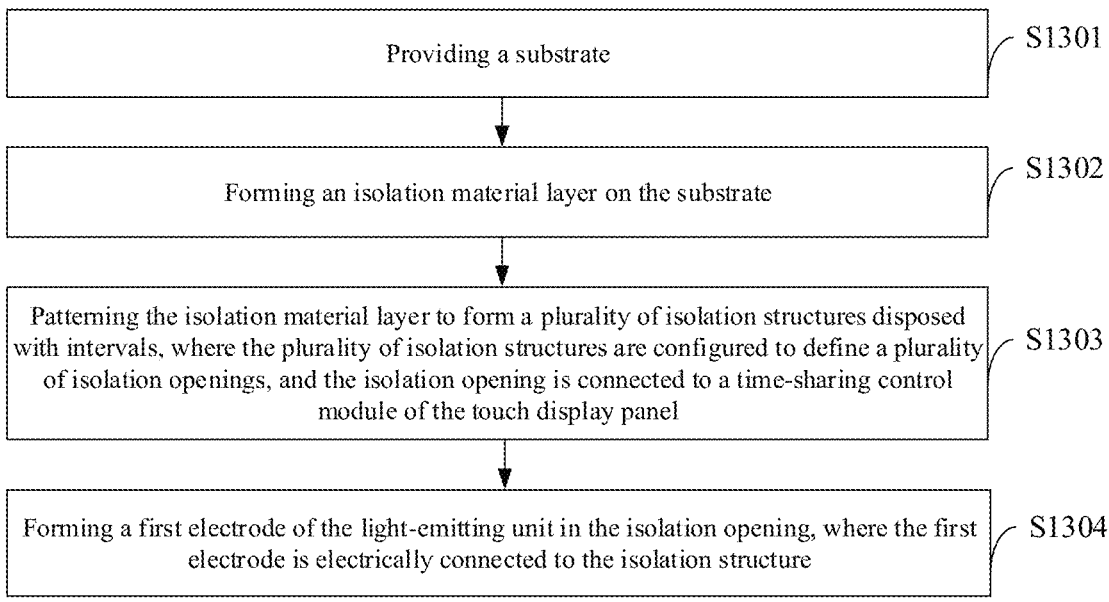

| | |
|---|---|
| Providing a substrate | S1301 |

↓

| | |
|---|---|
| Forming an isolation material layer on the substrate | S1302 |

↓

| | |
|---|---|
| Patterning the isolation material layer to form a plurality of isolation structures disposed with intervals, where the plurality of isolation structures are configured to define a plurality of isolation openings, and the isolation opening is connected to a time-sharing control module of the touch display panel | S1303 |

↓

| | |
|---|---|
| Forming a first electrode of the light-emitting unit in the isolation opening, where the first electrode is electrically connected to the isolation structure | S1304 |

FIG. 13

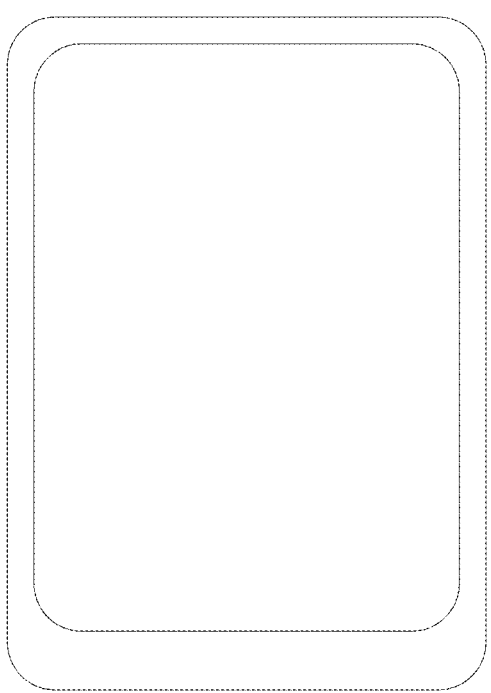

FIG. 14

TOUCH DISPLAY PANEL AND MANUFACTURING METHOD THEREFOR

CROSS-REFERENCE TO RELATED APPLICATIONS

This application is a continuation of International Application No. PCT/CN2024/084420, filed on Mar. 28, 2024, which claims priority to Chinese Patent Application No. 202311793956.7, filed on Dec. 22, 2023. The disclosures of the aforementioned applications are hereby incorporated by reference in their entireties.

TECHNICAL FIELD

Embodiments of the present disclosure relates to the field of display technologies, and in particular, to a touch display panel and a manufacturing method therefor.

BACKGROUND

With the development of touch technology and display technology, the touch display panel has become increasingly popular. Taking a common touch-type intelligent mobile terminal as an example, a design of an increasingly high screen-to-body ratio has brought users with a more excellent visual experience than the past.

At the same time, the lightweight and thin design of the touch display panel has further received increasing attention from people.

SUMMARY

In view of this, the present disclosure aims to provide a touch display panel and a manufacturing method therefor, and a display device to effectively reduce a thickness of stacked layers.

According to a first aspect, the present disclosure provides a touch display panel, including: a substrate; a light-emitting layer, provided on a side of the substrate and including a plurality of light-emitting units, where the light-emitting unit includes a first electrode located on a side facing away from the substrate; a plurality of isolation structures, provided on the side of the substrate with intervals, where the plurality of isolation structure are configured to define a plurality of isolation openings, the light-emitting unit is provided in the isolation opening, adjacent light-emitting units are isolated by the isolation structure, and the first electrode is electrically connected to the isolation structure; and a time-sharing control module, electrically connected to corresponding isolation structures, and configured to control a corresponding isolation structure to receive a touch signal or a power signal in a time division mode.

According to a second aspect, the present disclosure further provides a touch display panel, including: a substrate; a light-emitting layer, provided on a side of the substrate and including a plurality of light-emitting units, where the light-emitting unit includes a first electrode located on a side facing away from the substrate; and a plurality of isolation structures, provided on a side of the substrate with intervals, where the plurality of the isolation structures are configured to define a plurality of isolation openings, the light-emitting unit is provided in the isolation opening, adjacent light-emitting units are isolated by the isolation structure, and the first electrode is electrically connected to the isolation structure, and the isolation structure is configured to receive a touch signal or a power signal.

According to a third aspect, the present disclosure further provides a manufacturing method for a touch display panel, including: providing a substrate; forming an isolation material layer on the substrate; patterning the isolation material layer to form a plurality of isolation structures disposed with intervals, where the plurality of isolation structures are configured to define a plurality of isolation openings, and the isolation structure is electrically connected to a time-sharing control module of the touch display panel; and forming a first electrode of the light-emitting unit in the isolation opening, where the first electrode is electrically connected to the isolation structure.

According to a forth aspect, the present disclosure further provides a display device, including the touch display panel according to the first aspect or the second aspect of the present disclosure.

According to the present disclosure, the touch display panel includes a substrate, a light-emitting layer, a plurality of isolation structures, and a time-sharing control module. The light-emitting layer is provided on a side of the substrate and includes a plurality of light-emitting units. The light-emitting unit includes a first electrode located on a side facing away from the substrate. The plurality of isolation structures are provided on the side of the substrate with intervals, and the plurality of isolation structures are configured to define a plurality of isolation opening. The light-emitting unit is provided in the isolation opening, and adjacent light-emitting units are isolated by the isolation structure. The first electrode is electrically connected to the isolation structure. The time-sharing control module is electrically connected to corresponding isolation structures, and is configured to control a corresponding isolation structure to receive a touch signal or a power signal in a time division mode. Thus, there is no need to add an additional touch electrode film layer to achieve touch function of the touch display panel, thereby reducing a thickness of the touch display panel with preparation cost reduced as well.

BRIEF DESCRIPTION OF THE DRAWINGS

By describing embodiments of the present disclosure in more detail with reference to accompanying drawings, the above and other objects, features and advantages of the present disclosure become more apparent. The accompanying drawings are used to provide a further understanding of the embodiments of the present disclosure, constitute a part of the specification, and are used to explain the present disclosure together with the embodiments of the present disclosure, and do not constitute a limitation on the present disclosure. In the drawings, the same reference numbers generally represent the same components or steps.

FIG. 13 is a flowchart of a method for preparing a touch display panel according to an embodiment of the present disclosure.

FIG. 14 is a schematic structural diagram of a display device according to an embodiment of the present disclosure.

DETAILED DESCRIPTION OF THE EMBODIMENTS

Figure 1:
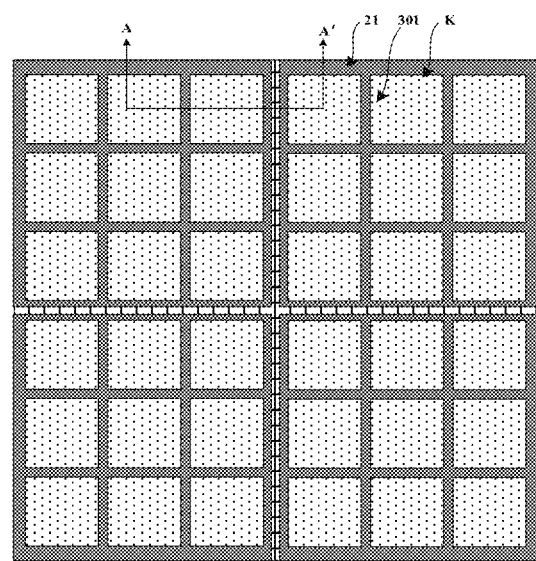
FIG. 1 is a planar schematic structural diagram of a touch display panel according to an embodiment of the present disclosure.

Unless otherwise defined, technical or scientific terms used in the embodiments of the present specification shall have the same meanings as commonly understood by those skilled in the art to which the present specification belongs. The terms "first", "second" and similar words used in the embodiments of the present specification do not indicate any order, quantity, or importance, but are only used to avoid confusion of constituent elements.

Unless the context requires otherwise, in the entire specification, "a plurality of" means "at least two", and "comprising" is interpreted as open, inclusive, that is, "including, but not limited to". In the description of the present specification, the terms "an embodiment", "some embodiments", "an exemplary embodiment", "an example", "a specific example" or "some examples", and the like are intended to indicate that a particular feature, structure, material, or characteristic related to the embodiment or example is included in at least one embodiment or example of the present specification. The schematic representation of the above terms does not necessarily refer to the same embodiment or example.

Technical solutions in the embodiments of the present specification are clearly and completely described below with reference to the accompanying drawings in the embodiments of the present specification. Obviously, the described embodiments are only a part of the embodiments of the present specification, not all of them. All other embodiments obtained by a person of ordinary skill in the art based on the embodiments in the present specification without creative efforts shall fall within the protection scope of the present specification.

With a rapid development of display technologies, the touch display panel has a broad application space in the fields of vehicle-mounted, mobile phone, tablet, computer, television, and the like. Touch function has become one of standard features in most display panels, and capacitive touch display panels are widely used.

Capacitive touch display mainly includes mutual capacitive touch display and self-capacitive touch display. The self-capacitive touch display is a touch technology based on a principle of capacitive sensing, using conduction of a current on a surface of a touch display panel to detect a touch position. The self-capacitive touch display is generally applicable to a single-point touche or small amounts of synchronous touche.

Currently, a touch scheme commonly used by organic light emitting diode (OLED) display panels is in-cell, but a preparation cost and a thickness of stacked layers still need to be reduced for the in-cell touch display panel.

Therefore, the present disclosure provides a solution to effectively reduce a thickness of stacked layers of a touch display panel. A plurality of isolation openings are defined by an isolation structure, and first electrodes of a plurality of light-emitting units are provided in the plurality of isolation openings respectively, so that the first electrodes are electrically connected to each other by the isolation structure to form an electrode structure. By providing the plurality of isolation structures on the substrate with intervals, the isolation structure and the first electrode electrically connected to the isolation structure may be multiplexed as a touch electrode. Meanwhile, a time-sharing control module is electrically connected to corresponding isolation structures, so as to control a corresponding isolation structure to receive a touch signal or a power signal in a time division mode. Thus, there is no need to add an additional touch electrode film layer to achieve touch function of the touch display panel, thereby reducing a thickness of the touch display panel with preparation cost reduced as well.

Figure 2:
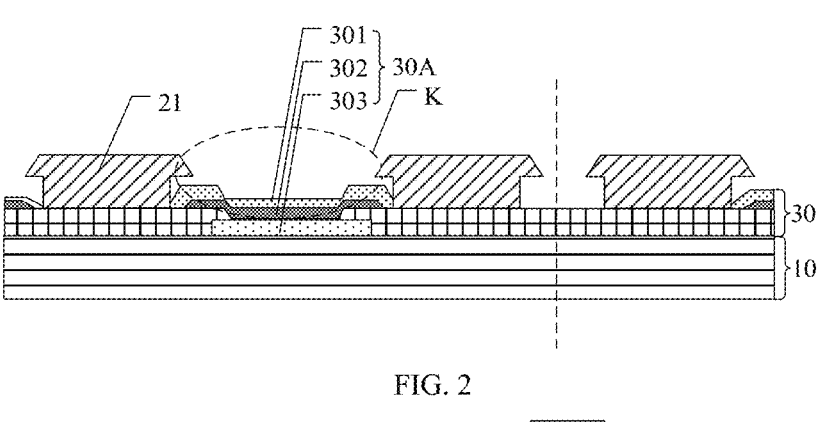
FIG. 2 is a cross-sectional view of the touch display panel along a cutting line AA' as shown in FIG. 1.
Figure 3:
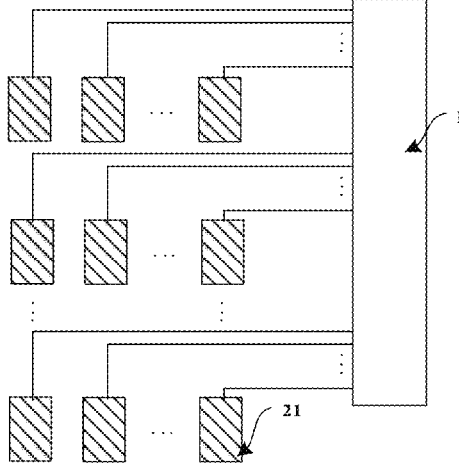
FIG. 3 is a schematic diagram of a connection relationship of structures of a touch display panel according to an embodiment of the present disclosure.

Specifically, as an optional implementation of the present disclosure, an embodiment of the present disclosure provides a touch display panel. FIG. 1 is a planar schematic structural diagram of a touch display panel according to an embodiment of the present disclosure. FIG. 2 is a cross-sectional view of the touch display panel along a cutting line AA' as shown in FIG. 1. FIG. 3 is a schematic diagram of a connection relationship of structures of a touch display panel according to an embodiment of the present disclosure. As shown in FIG. 1, FIG. 2 and FIG. 3, the touch display panel may at least include: a substrate 10, a light-emitting layer 30, a plurality of isolation structures 21, and a time-sharing control module F.

The substrate 10 is mainly used for supporting and load-bearing. Specifically, the substrate 10 may be a rigid substrate such as a glass substrate or a silicon substrate, as well as a flexible substrate such as a stainless use steel (SUS) substrate or a flexible polyimide (PI) substrate. That is to say, the display panel in this embodiment may be a non-bendable rigid display panel or a bendable flexible display panel.

The light-emitting layer 30 is provided on a side of the substrate 10 and includes a plurality of light-emitting units 30A. The light-emitting unit 30A includes a first electrode 301 located on a side facing away from the substrate 10.

The isolation structures 21 are provided on the side of the substrate 10 with intervals, and the plurality of isolation structures 21 are configured to define a plurality of isolation openings K. The light-emitting unit 30A is provided in the isolation opening K, and adjacent light-emitting units 30A are isolated by the isolated structure 21. The first electrode 301 is electrically connected to the isolation structure 21.

The first electrode 301 may be a cathode.

A plurality of first electrodes 301 are located in the plurality of isolation openings K, and the isolation structure 21 is electrically connected to the plurality of first electrodes 301. It can be seen that the plurality of first electrodes 301 are electrically connected to each other by the isolation structure 21, so that each of the plurality of isolation structures 21 and the first electrode 301 electrically connected to the isolation structure 21 may serve as an independent electrode structure, and provide a structural basis for multiplexing the independent electrode structure as a touch electrode.

In implementation, each isolation structure 21 and the first electrode 301 electrically connected to the isolation structure 21 are multiplexed as a touch electrode. Thus, the plurality of isolation structures 21 provided on the substrate 10 with intervals and the first electrodes 301 electrically connected to the isolation structures 21, that is, a plurality of touch electrodes provided on the substrate 10 with intervals, may achieve self-capacitive touch display of the touch display panel.

Meanwhile, it may be avoided to additionally prepare a touch electrode layer by multiplexing the isolation structure 21 and the first electrodes 301 electrically connected to the isolation structure 21 as a touch electrode, thereby reducing a thickness of stacked layers of the touch display panel, saving a quantity of mask plates, and reducing a preparation cost.

International Patent Application No. PCT/CN2023/134518 and Chinese Patent Applications including No. 202310759370.2, No. 202310740412.8, No. 202310707209.0, and No. 202311346196.5 describe a related art of an isolation structure, and the contents thereof are incorporated by reference in the present application for reference.

As shown in FIG. 3, the time-sharing control module F is electrically connected to corresponding isolation structures 21, and is configured to control a corresponding isolation structure 21 to receive a touch signal or a power signal in a time division mode.

It should be understood that the first electrode 301 may be a cathode, and correspondingly, the power signal may be a cathode signal.

The time-sharing control module F is used to control the corresponding isolation structure 21 to receive the touch signal or the power signal, that is, a touch function and a display function of the touch display panel may be switched by using the time-sharing control module F, both ensuring achievements of the display and touch functions of the touch display panel and reducing the preparation cost.

In actual application, the plurality of isolation structures 21 may be provided on the substrate 10 with intervals, so that the arrangement of the touch electrodes is more uniform, avoiding touch failure or poor touch effect in part of the touch display area due to sparse distribution of touch electrodes.

Figure 4:
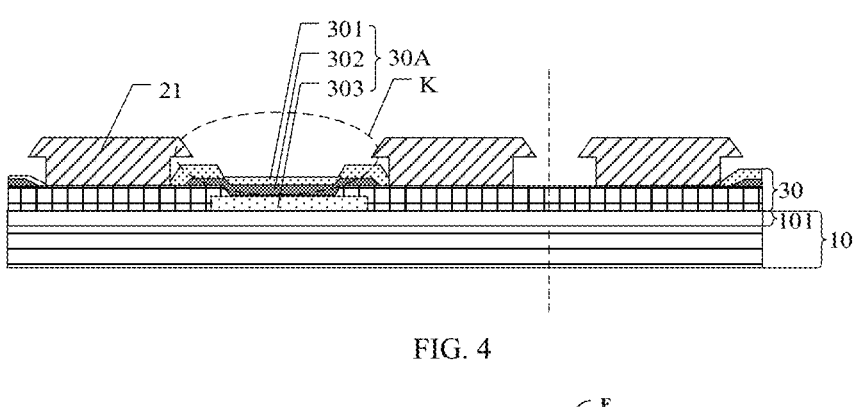
FIG. 4 is a schematic structural diagram of a touch display panel according to still another embodiment of the present disclosure.
Figure 5:
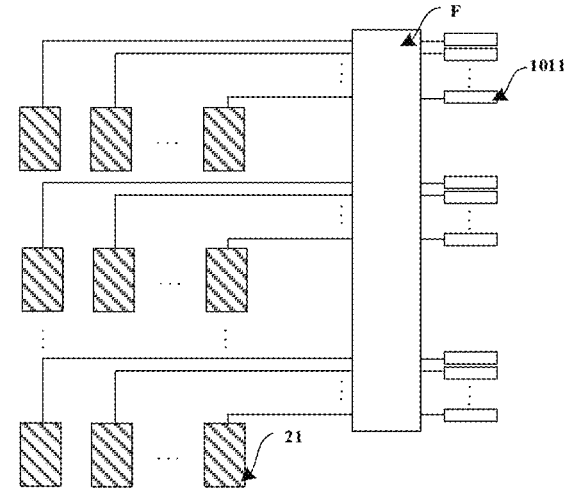
FIG. 5 is a schematic structural diagram of a touch display panel according to yet still another embodiment of the present disclosure.

In order to ensure achievements of the touch function and the display function of the touch display panel respectively, in some embodiments, as shown in FIG. 4 and FIG. 5, the substrate 10 may include a driving circuit layer 101, the driving circuit layer 101 includes a plurality of pixel driving circuits 1011. A power signal terminal of the pixel driving circuit 1011 is electrically connected to an isolation structure 21 controlled by the time-sharing control module F, to send a power signal to the first electrode 301 by the time-sharing control module F.

Specifically, as shown in FIG. 5, the power signal terminal of the pixel driving circuit 1011 is electrically connected to the isolation structure 21 controlled by the time-sharing control module F through the time-sharing control module F, and is configured to provide the power signal to the time-sharing control module F, to send the power signal to the corresponding isolation structure 21 by the time-sharing control module F.

Figure 6:
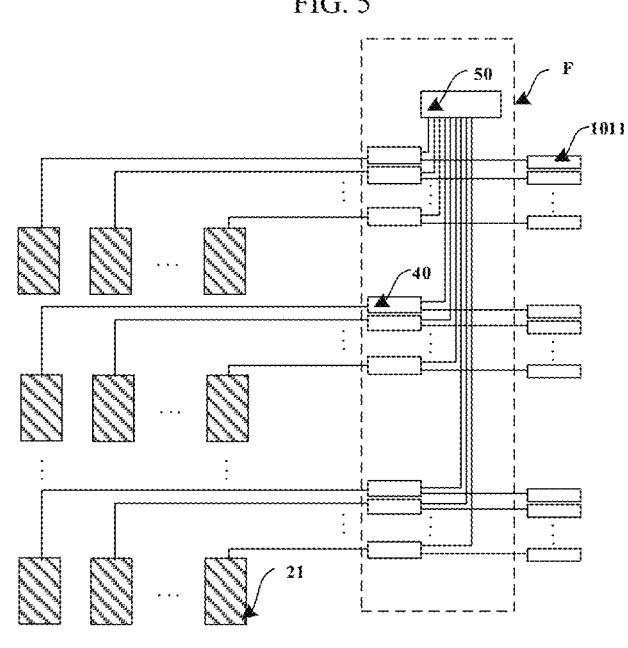
FIG. 6 is a schematic structural diagram of a touch display panel according to yet still another embodiment of the present disclosure.

In some embodiments, as shown in FIG. 6, the time-sharing control module F may include a plurality of selection circuits 40. The power signal terminal of the pixel driving circuit 1011 is electrically connected to the isolation structure 21 controlled by the selection circuit 40 through the selection circuit 40, to provide the power signal to the first electrode 301 by the selection circuit 40.

In this way, when the power signal is received, the first electrode 301 may cooperate with other structures of the light-emitting unit 30A to achieve the display function of the touch display panel.

In some embodiments, as shown in FIG. 6, the time-sharing control module F may further include a control chip 50. The control chip 50 is configured to provide a touch signal to a corresponding selection circuit 40, to provide the touch signal to the first electrode 301 by the selection circuit 40.

In this way, when the first electrode 301 receives the touch signal, the first electrodes 301 and the isolation structure 21 electrically connected to the first electrodes 301 may serve as a touch electrode to achieve the touch function of the touch display panel.

In actual application, the control chip 50 may further be electrically connected to the light-emitting unit 30A through the pixel driving circuit 1011 to apply a driving signal to the light-emitting unit 30A by the pixel driving circuit 1011.

In implementation, the pixel driving circuit 1011 may include at least one of pixel driving circuits of a 2T1C structure, a 7T1C structure, a 6T1C structure, and a 3T1C structure pixel driving circuit. T represents a transistor, and C represents a capacitor.

Similarly, the plurality of isolation structures 21 and the first electrodes 301 electrically connected the isolation structures 21 may not only serve as a plurality of touch electrodes to achieve the touch function, but also may further serve as first electrodes 301 of the plurality of light-emitting units 30A to achieve the display function. As the plurality of isolation structures 21 and the first electrodes 301 electrically connected the isolation structures 21 serve as the touch electrodes and the first electrodes 301, the touch signal received by the touch electrodes and the power signal received by the first electrodes 301 are not same. Therefore, in order to avoid mutual interference between the touch and the display functions, in some embodiments, a control timing of the control chip 50 may include a touch timing segment and a display timing segment.

The touch timing segment and the display timing segment are non-overlapping timing segments.

Specifically, the selection circuit 40 is configured to send a touch signal provided by the control chip 50 to an isolation structure 21 correspondingly connected to the selection circuit 40 in the touch timing segment, and is configured to send a power signal provided by the pixel driving circuit 1011 to the isolation structure 21 correspondingly connected to the selection circuit in the display timing segment.

In this way, in the touch timing segment, the plurality of isolation structures 21 only receive the touch signal provided by the selection circuit 40, so as to serve as a touch structure for implementation of the touch function; and in the display timing segment, the plurality of isolation structures 21 only receive the power signal provided by the pixel driving circuit 1011, that is, the first electrode 301 only receives the power signal, ensuring a cathode function of the first electrode 30, to serve as a display structure for implementation of the display function. The touch timing segment and the display timing segment are executed separately, thereby ensuring that the touch function and the display function are executed separately, avoiding an interference between implementation of the touch function and implementation of the display function, and ensuring touch effect and display effect.

Figure 7:
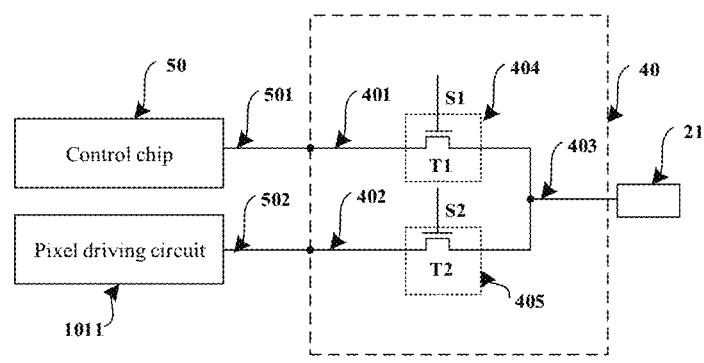
FIG. 7 is a schematic structural diagram of a touch display panel according to yet still another embodiment of the present disclosure.

In order to ensure that the selection circuit 40 may provide the touch signal in the touch timing segment and the power signal in the display timing segment, in some embodiments, as shown in FIG. 7, the selection circuit 40 may include a first inputting terminal 401, a second inputting terminal 402, and an outputting terminal 403. The control chip 50 is configured to control conduction between the first inputting terminal 401 and the outputting terminal 403, and conduction between the second inputting terminal 402 and the outputting terminal 403 separately through a control signal line.

Specifically, in the touch timing segment, the control chip 50 is configured to control the conduction between the first inputting terminal 401 and the outputting terminal 403 through a first control signal line S1, and provides a touch signal through a first connection line 501.

In the display timing segment, the control chip 50 is configured to control the conduction between the second inputting terminal 402 and the outputting terminal 403 through a second control signal line S2, and provides the power signal through a second connection line 502.

The first inputting terminal 401 is connected to the control chip 50 through the first connection line 501. A touch signal is provided to the first inputting terminal 401 by the control chip 50. The second inputting terminal 402 is connected to the pixel driving circuit 1011 through the second connection line 502. A power signal is provided to the second inputting terminal 402 by the pixel driving circuit 1011. The outputting terminal 403 is connected to an isolation structure 21 correspondingly connected to the selection circuit 40.

The driving chip 50 may be specifically configured to provide the touch signal through the first connection line 501 in the touch timing segment.

The pixel driving circuit 1011 may be specifically configured to provide the power signal through the second connecting line 502 in the display timing segment.

The selection circuit 40 may be specifically configured to conduct the first inputting terminal 401 and the outputting terminal 403 in the touch timing segment, to output the touch signal to a corresponding isolation structure 21 through the outputting terminal 403. And the selection circuit 40 may be configured to conduct the second inputting terminal 402 and the outputting terminal 403 in the display timing segment, to output the power signal to the corresponding isolation structure 21 through the outputting terminal 403.

In order to better achieve conduction and disconnection between the first inputting terminal 401 and the outputting terminal 403 and between the second inputting terminal 402 and the outputting terminal 403, in some embodiments, as shown in FIG. 7, the selection circuit 40 may further include a first switch unit 404 and a second switch unit 405. The first inputting terminal 401 is connected to the outputting terminal 403 through the first switch unit 404, and the first control signal line S1 is connected to a control terminal of the first switch unit 404. The second inputting terminal 402 is connected to the outputting terminal 403 through the second switch unit 405, and the second control signal line S2 is connected to a control terminal of the second switch unit 405.

In a specific implementation, the first switch unit 404 may include a first transistor T1, and the second switch unit 405 may include a second transistor T2. The first inputting terminal 401 is connected to the outputting terminal 503 through the first transistor T1, and the second inputting terminal 402 is connected to the outputting terminal 503 through the second transistor T2. The first control signal line S1 is connected to a control terminal of the first transistor T1, and the second control signal line S2 is connected to a control terminal of the second transistor T2.

The first transistor T1 is configured to be turned on and off under a control of a first control signal provided by the first control signal line S1. The second transistor T2 is configured to be turned on and off under a control of a second control signal provided by the second control signal line S2.

Specifically, as shown in FIG. 7, the control terminal of the first transistor T1 is connected to the first control signal line S1, a first electrode of the first transistor T1 is connected to the first inputting terminal 401, and a second electrode of the first transistor T1 is connected to the outputting terminal 403. Similarly, the control terminal of the second transistor T2 is connected to the second control signal line S2, a first electrode of the second transistor T2 is connected to the second inputting terminal 402, and a second electrode of the second transistor T2 is connected to the outputting terminal 403.

For example, the first transistor T1 and the second transistor T2 may both be N-type transistors. When both the first control signal and the second control signal are high-level signals, both the first transistor T1 and the second transistor T2 are in an on state, that is, the first electrode and the second electrode of the first transistor T1 are conducted, and the first electrode and the second electrode of the second transistor T2 are conducted. When both the first control signal and the second control signal are low-level signals, both the first transistor T1 and the second transistor T2 are in an off state, that is, the first electrode and the second electrode of the first transistor T1 are disconnected, and the first electrode and the second electrode of the second transistor T2 are disconnected. Thus, on and off state of the first transistor T1 and the second transistor T2 may be controlled through the first control signal and the second control signal, to achieve output switching of the selection circuit 40 between the first inputting terminal 401 and the outputting terminal 403, and between the second inputting terminal 402 and the outputting terminal 403.

On the other hand, in order to avoid affecting display effect of the touch display panel by switching between the touch function and the display function, in some embodiments, a frame of image of the touch display panel may include a display time period and a black frame insertion time period.

The display timing segment may include the display time period. The touch timing segment may include the black frame insertion time period. A duration of the display time period is longer than a duration of the black frame insertion time period.

That is to say, in the black insertion time period, the selection circuit 40 is configured to achieve conduction between the control chip 50 and the plurality of isolation structures 21 in response to the first control signal, to make the plurality of isolation structures 21 receive the touch signal output by the control chip 50. In the display time period, the selection circuit 40 is configured to achieve conduction between the pixel driving circuit 1011 and the isolation structure 21 corresponding to the pixel driving circuit 1011 in response to the second control signal, to make the corresponding isolation structure 21 receive the power signal.

In this way, the touch function is achieved during the black frame insertion time period, and normal light-emitting display of the light-emitting unit 30A is executed during the display time period. Time for touch function and display function may be effectively divided, and the first electrodes 301 of the light-emitting unit 30A and the isolation structure 21 electrically connected to the first electrodes 301 are multiplexed as the touch electrode.

Figure 8:
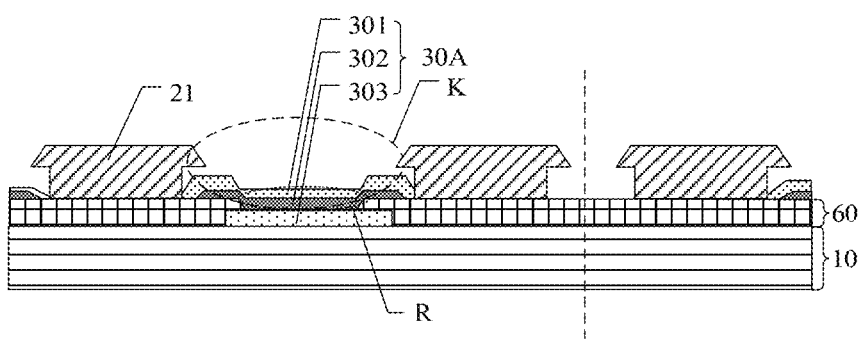
FIG. 8 is a schematic structural diagram of a touch display panel according to yet still another embodiment of the present disclosure.

In some embodiments, as shown in FIG. 8, the light-emitting unit 30A may further include a light-emitting function layer 302 and a second electrode 303. The light-emitting function layer 302 is located in the isolation opening K and isolated by the isolation structure 21. The light-emitting function layer 302 is located on a side, close to the substrate 10, of the first electrode 301. The second electrode 303 is located on a side, close to the substrate 10, of the light-emitting function layer 302.

The light-emitting function layer 302 may include a hole injection layer, a hole transport layer, a light-emitting layer, an electron transport layer, and an electron injection layer sequentially stacked on a side, facing away from the substrate 10, of the second electrode 303. A side, facing away from the substrate 10, of the electron injection layer is provided with the first electrode 301.

The light-emitting function layer 302 may include a material (hereinafter referred to as a light-emitting material) having electroluminescence (EL) performance. The second electrode 303 may also be referred to as an anode, and is configured to provide holes for the light-emitting function layer 302. The first electrode 301 may be referred to as a cathode, and is configured to provide electrons to the light-emitting function layer 302. The holes provided by the second electrode 303 and the electrons provided by the first electrode 301 may excite the light-emitting material of the light-emitting function layer 302 to emit light after recombination in the light-emitting function layer 302. Material of the hole injection layer and the hole transport layer may a material with a high hole mobility, to make the holes generated by the second electrode 303 easily transmitted to the light-emitting function layer 302. Similarly, material of the electron injection layer and the electron transport layer may be a material with a high electron mobility, to make electrons generated by the first electrode 301 easily transmitted to the light-emitting function layer 302.

In some embodiments, as shown in FIG. 8, the touch display panel may further include an insulating layer 60. The insulating layer 60 is provided with a plurality of pixel openings R. The pixel opening R exposes part of the second electrode 303, and is communicated with the isolation opening K. The light-emitting function layer 302 of the light-emitting unit 30A is located in the pixel opening R.

In implementation, the isolation structure 21 is located on a side, facing away from the substrate 10, of the insulating layer.

In some other embodiments, the insulating layer 60 may further be provided with an accommodating opening, and the isolation structure 21 is located in the accommodating opening of the insulating layer 60. Alternatively, the insulating layer 60 may include a plurality of insulating portions disposed with intervals. The insulating portion covers a side edge of the second electrode 303 and is annularly disposed around the side edge of the second electrode 303, and the isolation structure 21 is located in an interval between adjacent insulating portions.

Insulation between the second electrode 303 and the isolation structure 21 may be achieved by insulating property of the insulating layer 60. In addition, an area of the second electrode 303 of the light-emitting unit 30A exposed by the pixel opening R is a light-emitting area of the light-emitting unit 30A, and the light-emitting area may be better defined through the pixel opening R of the insulating layer 60.

In actual application, the insulating layer 60 may include a pixel defining layer.

Figure 9:
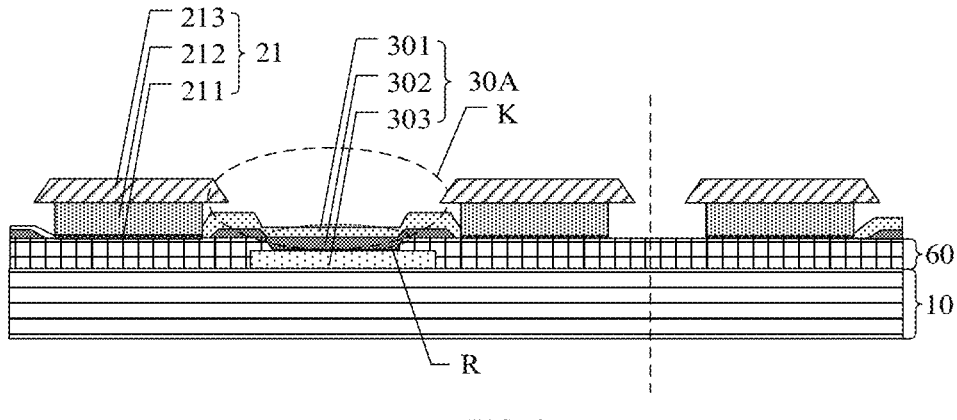
FIG. 9 is a schematic structural diagram of a touch display panel according to yet still another embodiment of the present disclosure.

In some embodiments, as shown in FIG. 9, the isolation structure 21 may include a blocking portion 211 located on a side of the substrate 10 and a supporting portion 212 located on a side, facing away from the substrate 10, of the blocking portion 211. The blocking portion 211 is an insulating structure, and the supporting portion 212 is of a conductive structure.

In order to ensure that in the same isolation unit 20, first electrodes 301 of the plurality of light-emitting units 30A are electrically connected to each other through the isolation structure 21, the side edge of the first electrode 301 may be configured to be in contact with the supporting portion 212, so as to achieve an electrical connection between the first electrodes 301 of the plurality of light-emitting units 30A through the supporting portion 212 of the isolation structure 21.

In this way, when the light-emitting function layer 302 of the light-emitting unit 30A is evaporated, light-emitting function layers 302 of adjacent light-emitting units 30A may be isolated by the isolation structure 21, so as to obtain independent light-emitting pixels each independent from each other. In addition, as shown in FIG. 7, the blocking portion 211 on the side, close to the substrate 10, of the isolation structure 21 is an insulating structure, so that the light-emitting function layers 302 of the adjacent light-emitting units 30A may be better insulated from each other. Specifically, in a case where the insulating blocking portion 211 is provided, even if part of the light-emitting function layer 302 of the light-emitting unit 30A is in contact with the isolation structure 21 during evaporation of the light-emitting function layer 302, a lateral leakage current may not be generated or only a small lateral leakage current may be generate, which is not enough for adjacent light-emitting unit to emit light, since the blocking portion 211 is the insulating structure. Therefore, a problem of color crosstalk is avoided, thereby improving the display performance of the touch display panel.

A material of the blocking portion 211 may include an organic material or an inorganic material. For example, the organic materials may include silicon oxide (SiOx), silicon nitride (SiNx), and the like. And the organic materials may include polyimide (PI). Specifically, the material of the blocking portion 211 may be selected based on an actual situation, as long as the blocking portion 211 has sufficient insulating performance is ensured.

In some embodiments, as shown in FIG. 9, the isolation structure 21 may further include a partition portion 213 located on a side, facing away from the substrate 10, of the supporting portion 212. An orthographic projection of the supporting portion 212 on the substrate 10 is within an orthographic projection of the partition portion 213 on the substrate 10.

Specifically, a size of the supporting portion 212 in a direction parallel to the substrate 10 is less than a size of the partition portion 213 in the direction parallel to the substrate 10, the partition portion 213 forms a structure similar to an "inverted step" relative to the supporting portion 212. In this way, during evaporation of the light-emitting function layer 302 and the first electrode 301, material to be evaporated may be blocked by the partition portion 213, so that a part of the material is attached to a side surface, facing away from the substrate 10, of the partition portion 213, and a remaining material may reach interior of the isolation opening K to form the light-emitting function layer 302 and the first electrode 301.

The supporting portion 212 and the partition portion 213 are mutually independent structures and may be formed by different processing, and materials of the supporting portion 212 and the partition portion 213 may be the same or different. However, it may be understood that, in some other embodiments, the supporting portion 212 and the partition portion 213 may alternatively be an integrated structure.

Figure 10:
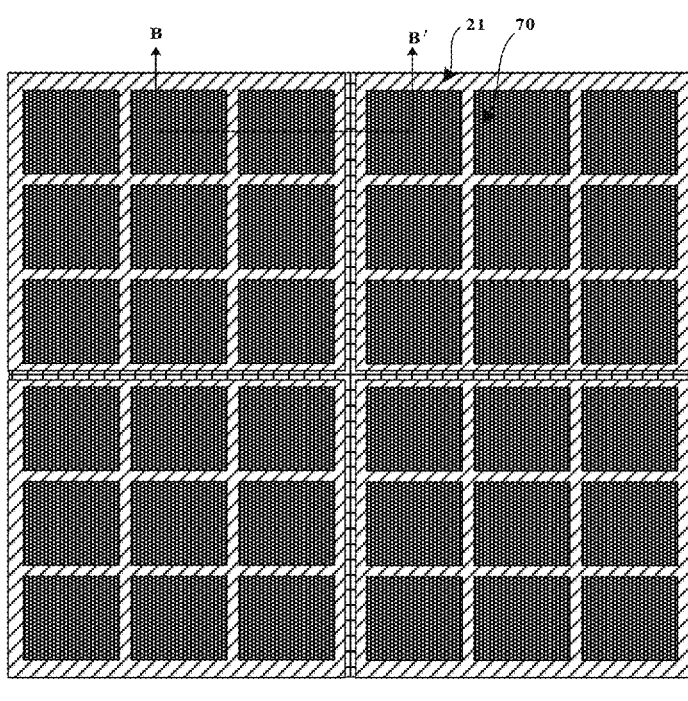
FIG. 10 is a planer schematic structural diagram of a touch display panel according to another embodiment of the present disclosure.
Figure 11:
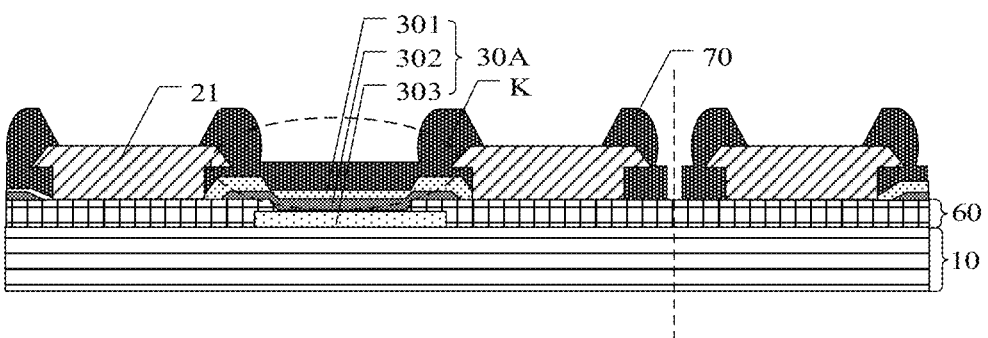
FIG. 11 is a cross-sectional view of the touch display panel along a cutting line BB' as shown in FIG. 10.

In some embodiments, as shown in FIG. 10 and FIG. 11, the touch display panel may further include a first encapsulation layer 70. The first encapsulation layer 70 may include a plurality of encapsulation portions disposed with intervals. The encapsulation portion is located on a side, facing away from the substrate 10, of the first electrode 301. And an orthographic projection of the encapsulation portion on the substrate 10 covers an orthographic projection of the first electrode 301 on the substrate 10. In this way, the light-emitting unit 30A may be protected by the encapsulation portion to prevent the light-emitting unit 30A from being damaged.

In actual application, the first encapsulation layer 70 may be formed by chemical vapor deposition (CVD). A material of the first encapsulation layer may be an inorganic material.

Of course, the material of the first encapsulation layer in the present disclosure is not limited to being an inorganic material. In some other embodiments, the material of the first encapsulation layer may also be an organic material. Specifically, the material of the first encapsulation layer may be provided based on an actual encapsulation requirement and a technical requirement.

Figure 12:
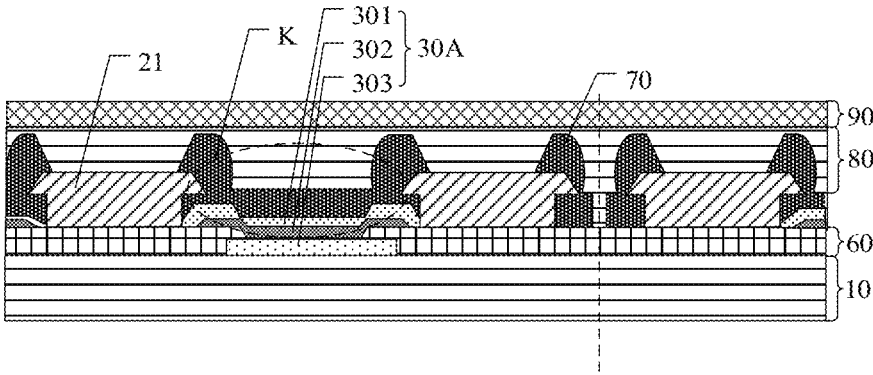
FIG. 12 is a schematic structural diagram of a touch display panel according to yet still another embodiment of the present disclosure.

In some embodiments, as shown in FIG. 12, the touch display panel may further include a second encapsulation layer 80. The second encapsulation layer 80 is located on a side, facing away from the substrate 10, of the first encapsulation layer 70. An orthographic projection of the second encapsulation layer 80 on the substrate 10 covers the substrate 10.

The orthographic projection of the second encapsulation layer 80 on the substrate 10 covers the substrate 10, thereby realizing encapsulation of a touch electrode layer and encapsulation of the light-emitting unit 30A.

In addition, the second encapsulation layer 80 is used to encapsulate the touch electrode layer and the light-emitting unit 30A, so that a mask may be shared, and an additional mask for encapsulation of the touch electrode layer may be saved, thereby reducing the preparation cost.

Specifically, a material of the second encapsulation layer 80 may be an organic material or an inorganic material. In implementation, the second encapsulation layer may be formed by inkjet printing.

In some embodiments, as shown in FIG. 12, the touch display panel may further include a third encapsulation layer 90. The third encapsulation layer 90 is located on a side, facing away from the substrate 10, of the second encapsulation layer 80. An orthographic projection of the third encapsulation layer 90 on the substrate 10 covers the substrate 10.

In actual application, A material of the first encapsulation layer 70 and the third encapsulation layer 90 may be an inorganic material, and a material of the second encapsulation layer 80 may be an organic material. The second encapsulation layer 80 made of the organic material is located between the first encapsulation layer 70 and the third encapsulation layer 90 made of the inorganic material to form an encapsulation structure. The encapsulation structure may better isolate water and oxygen and improve encapsulation effect.

As another optional implementation of the disclosure, an embodiment of the present disclosure further provides a touch display panel. As shown in FIG. 2, the touch display panel may include: a substrate 10, a light-emitting layer 30, and a plurality of isolation structures 21.

The substrate 10 is mainly used for supporting and load-bearing. Specifically, the substrate 10 may be a rigid substrate such as a glass substrate or a silicon substrate, as well as a flexible substrate such as a stainless use steel (SUS) substrate or a flexible polyimide (PI) substrate. That is to say, the display panel in this embodiment may be a non-bendable rigid display panel or a bendable flexible display panel The light-emitting layer 30 is provided on a side of the substrate 10 and includes a plurality of light-emitting units 30A. The light-emitting unit 30A includes a first electrode 301 located on a side facing away from the substrate 10.

The isolation structure 21 is disposed on the side of the substrate 10 with intervals, and a plurality of isolation openings K are defined by the isolation structure 21. The light-emitting unit 30A is provided in the isolation opening K, and adjacent light-emitting units 30A are isolated by the isolated structure 21. The first electrode 301 is electrically connected to the isolation structure 21.

The isolation structure is configured to receive a touch signal or a power signal.

The first electrode 301 may be a cathode.

A plurality of first electrodes 301 are located in the plurality of isolation openings K, and the isolation structure 21 is electrically connected to the plurality of first electrodes 301. It can be seen that the plurality of first electrodes 301 are electrically connected to each other by the isolation structure 21, so that each of the plurality of isolation structures 21 and the first electrode 301 electrically connected to the isolation structure 21 may serve as an independent electrode structure, and provide a structural basis for multiplexing the independent electrode structure as a touch electrode In implementation, each isolation structure 21 and the first electrode 301 electrically connected to the isolation structure 21 are multiplexed as a touch electrode. Thus, the plurality of isolation structures 21 provided on the substrate 10 with intervals and the first electrodes 301 electrically connected to the isolation structures 21, that is, a plurality of touch electrodes provided on the substrate 10 with intervals, may achieve self-capacitive touch display of the touch display panel.

Meanwhile, it may be avoided to additionally prepare a touch electrode layer by multiplexing the isolation structure 21 and the first electrodes 301 electrically connected to the isolation structure 21 as a touch electrode, thereby reducing a thickness of stacked layers of the touch display panel, saving a quantity of mask plates, and reducing a preparation cost.

In some embodiments, the touch display panel may further include a time-sharing control module, and the time-sharing control module is the same as the time-sharing control module according to any one of the above embodiments. The touch display panel may further include at least one of an insulating layer, a first encapsulation layer, a second encapsulation layer, and a third encapsulation layer. Similarly, the light-emitting layer, the isolation structure, the insulating layer, the first encapsulation layer, the second encapsulation layer, and the third encapsulation layer of the touch display panel may also have the same film layer structure as described in any one of the above embodiments, and details are not described herein again.

As another optional implementation of the present disclosure, an embodiment of the present disclosure further provides a manufacturing method for a touch display panel. As shown in FIG. 13, the manufacturing method for the touch display panel may include at least the following steps.

S1301: providing a substrate.

S1302: forming an isolation material layer on the substrate.

S1303: patterning the isolation material layer to form a plurality of isolation structures disposed with intervals, where the plurality of isolation structures are configured to define a plurality of isolation openings, and the isolation opening is connected to a time-sharing control module of the touch display panel.

S1304: forming a first electrode of the light-emitting unit in the isolation opening, where the first electrode is electrically connected to the isolation structure.

Specifically, the light-emitting function layer of the light-emitting unit and the first electrode may be sequentially formed in the isolation opening by means of evaporation.

In the embodiments of the present disclosure, the plurality of isolation openings are formed in the isolation structure. First electrodes of the plurality of light-emitting units are respectively provided in the plurality of isolation openings, and then the plurality of first electrodes are electrically connected to each other by the isolation structure to form an electrode structure. The plurality of isolation structures are disposed with intervals on the substrate, so that the isolation structure and the first electrode electrically connected the isolation structure may be multiplexed as a touch electrode. Thus, there is no need to add an additional touch electrode film layer for touch function, thereby reducing a preparation cost and a thickness of the touch display panel.

In some embodiments, after the first electrode is formed, a first encapsulation layer may further be formed on the first electrode, and a second encapsulation layer may be formed on a side, facing away from the substrate, of the first encapsulation layer. The second encapsulation layer is used for encapsulation of the plurality of isolation structures. In this way, the encapsulation layer of the touch electrode and the encapsulation layer of the isolation structure may share a mask, so that an additional mask does not need to be used for encapsulating the touch electrode layer, thereby reducing the preparation cost.

A structure of each layer of the touch display panel obtained by the manufacturing method and the corresponding description may be referred to the corresponding description in the touch display panel as described above.

As an optional implementation of the present disclosure, an embodiment of the present disclosure further provides a display device. The display device includes: the touch display panel according to any one of the above embodiments. As shown in FIG. 14, FIG. 14 is a schematic structural diagram of a display device according to an embodiment of the present disclosure. The display device may be a smartphone, a tablet computer, a digital camera, or the like, and details are not described herein again.

The embodiments in the present specification are described in a progressive manner, each embodiment focuses on differences from other embodiments, and the same or similar parts between the embodiments may be referred to each other.

The above description of the disclosed embodiments enables those skilled in the art to implement or use the present disclosure. Various modifications to these embodiments are apparent to those skilled in the art, and the generic principles defined herein may be implemented in other embodiments without departing from the spirit or scope of the present disclosure. Thus, the present disclosure is not limited to the embodiments shown herein, but is to be accorded the widest scope consistent with the principles and novel features disclosed herein.

What is claimed is:

1. A touch display panel, comprising:

a substrate;

a light-emitting layer, provided on a side of the substrate and comprising a plurality of light-emitting units, wherein a light-emitting unit comprises a first electrode located on a side facing away from the substrate;

a plurality of isolation structures, provided on a side of the substrate with intervals, wherein the plurality of isolation structures are configured to define a plurality of isolation openings, a light-emitting unit is provided in an isolation opening, adjacent light-emitting units are isolated by an isolation structure, and the first electrode is electrically connected to the isolation structure;

a time-sharing control module, electrically connected to corresponding isolation structures, wherein the time-sharing control module is configured to control a corresponding isolation structure to receive a touch signal or a power signal in a time division mode;

an insulating layer located between the isolation structure and the substrate, wherein the insulating layer is provided with a plurality of pixel openings, a pixel opening is communicated with the isolation opening, and the isolation structure is located on a side, facing away from the substrate, of the insulating layer;

wherein the substrate comprises a driving circuit layer, the driving circuit layer comprises a plurality of pixel driving circuits, and a power signal terminal of a pixel driving circuit is electrically connected to the isolation structure controlled by the time-sharing control module, to apply a power signal to the first electrode by the time-sharing control module; and the time-sharing control module comprises a plurality of selection circuits; and the power signal terminal of the pixel driving circuit is electrically connected to the isolation structure controlled by a selection circuit through the selection circuit, to provide the power signal to the first electrode by the selection circuit; and the time-sharing control module further comprises a control chip; and the control chip is configured to provide the touch signal to a corresponding selection circuit, to make the touch signal provided to the first electrode by the selection circuit; and the control chip is further electrically connected to the light-emitting unit through the pixel driving circuit, for sending a driving signal to the light-emitting unit by the pixel driving circuit.

2. The touch display panel according to claim 1, wherein the power signal terminal of the pixel driving circuit is electrically connected to the isolation structure controlled by the time-sharing control module through the time-sharing control module.

3. The touch display panel according to claim 1, wherein control timing of the control chip comprises a touch timing segment and a display timing segment; and the touch timing segment and the display timing segment are non-overlapping timing segments;

the selection circuit is configured to transmit the touch signal, provided by the control chip, to the isolation structure, which is correspondingly connected to the selection circuit in the touch timing segment, and transmit the power signal, provided by the pixel driving circuit, to the isolation structure, which is correspondingly connected to the selection circuit in the display timing segment.

4. The touch display panel according to claim 3, wherein the selection circuit comprises a first inputting terminal, a second inputting terminal and an outputting terminal, and the control chip is configured to control conduction between the first inputting terminal and the outputting terminal through a control signal line, and to control conduction between the second inputting terminal and the outputting terminal through another control signal line;

in the touch timing segment, the control chip is configured to control conduction between the first inputting terminal and the outputting terminal through a first control signal line, and provide the touch signal through a first connection line;

in the display timing segment, the control chip is configured to control conduction between the second inputting terminal and the outputting terminal through a second control signal line, and provide the power signal through a second connection line;

the first inputting terminal is connected to the control chip through the first connection line, and the touch signal is provided by the control chip; the second inputting terminal is connected to the pixel driving circuit through the second connection line, and the power signal is provided by the pixel driving circuit; and the outputting terminal is connected to the isolation structure which is correspondingly connected to the selection circuit;

the control chip is configured to provide the touch signal through the first connection line in the touch timing segment; and the pixel driving circuit is configured to provide the power signal through the second connection line in the display timing segment;

the selection circuit is configured to conduct the first inputting terminal and the outputting terminal in the touch timing segment, to output the touch signal to the corresponding isolation structure through the outputting terminal, and is configured to conduct the second inputting terminal and the outputting terminal in the display timing segment, to output the power supply signal to the corresponding isolation structure through the outputting terminal.

5. The touch display panel according to claim 4, wherein the selection circuit further comprises a first switch unit and a second switch unit; the first inputting terminal is connected to the outputting terminal through the first switch unit, the first control signal line is connected to a control terminal of the first switch unit, the second inputting terminal is connected to the outputting terminal through the second switch unit, and the second control signal line is connected to a control terminal of the second switch unit; and the first switch unit comprises a first transistor, and the second switch unit comprises a second transistor.

6. The touch display panel according to claim 3, wherein a frame of image of the touch display panel comprises a display time period and a black frame insertion time period; and the display timing segment comprises the display time period, the touch timing segment comprises the black frame insertion time period, and a duration of the display time period is longer than a duration of the black frame insertion time period.

7. The touch display panel according to claim 1, wherein the light-emitting unit further comprises a second electrode located on a side, close to the substrate, of the first electrode; a light-emitting function layer is provided between the second electrode and the first electrode;

the light-emitting function layer is located in the isolation opening, and is isolated by the isolation structure; and part of the second electrode is exposed by the pixel opening, and the light-emitting function layer of the light-emitting unit is located in the pixel opening.

8. The touch display panel according to claim 1, wherein the isolation structure comprises a blocking portion located on a side of a substrate and a supporting portion located on a side, facing away from the substrate, of the blocking portion; and the blocking portion is an insulating structure, the supporting portion is a conductive structure, and a side edge of the first electrode is in contact with the supporting portion.

9. The touch display panel according to claim 8, wherein the isolation structure further comprises a partition portion located on a side, facing away from the substrate, of the supporting portion, and an orthographic projection of the supporting portion on the substrate is within an orthographic projection of the partition portion on the substrate.

10. The touch display panel according to claim 1, further comprising a first encapsulation layer, wherein the first encapsulation layer comprises a plurality of encapsulation portions disposed with intervals; and an encapsulation portion is located on a side, facing away from the substrate, of the first electrode, and an orthographic projection of the encapsulation portion on the substrate covers an orthographic projection of the first electrode on the substrate.

11. The touch display panel according to claim 10, further comprising a second encapsulation layer, wherein the second encapsulation layer is located on a side, facing away from the substrate, of the first encapsulation layer, and an orthographic projection of the second encapsulation layer on the substrate covers the substrate.

12. The touch display panel according to claim 11, further comprising a third encapsulation layer, wherein the third encapsulation layer is located on a side, facing away from the substrate, of the second encapsulation layer, and an orthographic projection of the third encapsulation layer on the substrate covers the substrate.

13. A touch display panel, comprising:

a substrate;

a light-emitting layer, provided on a side of the substrate and comprising a plurality of light-emitting units, wherein the light-emitting unit comprises a first electrode located on a side facing away from the substrate;

a plurality of isolation structures, provided on a side of the substrate with intervals, wherein the plurality of isolation structures are configured to define a plurality of isolation openings, a light-emitting unit is provided in an isolation opening, adjacent light-emitting units are isolated by an isolation structure, the first electrode is electrically connected to the isolation structure; and a time-sharing control module, electrically connected to corresponding isolation structures, wherein the time-sharing control module is configured to control a corresponding isolation structure to receive a touch signal or a power signal in a time division mode;

wherein the substrate comprises a driving circuit layer, the driving circuit layer comprises a plurality of pixel driving circuits, and a power signal terminal of a pixel driving circuit is electrically connected to the isolation structure controlled by the time-sharing control module, to apply a power signal to the first electrode by the time-sharing control module; and the time-sharing control module comprises a plurality of selection circuits; and the power signal terminal of the pixel driving circuit is electrically connected to the isolation structure controlled by a selection circuit through the selection circuit, to provide the power signal to the first electrode by the selection circuit; and the time-sharing control module further comprises a control chip; and the control chip is configured to provide the touch signal to a corresponding selection circuit, to make the touch signal provided to the first electrode by the selection circuit; and the control chip is further electrically connected to the light-emitting unit through the pixel driving circuit, for sending a driving signal to the light-emitting unit by the pixel driving circuit.

14. The touch display panel according to claim 13, wherein control timing of the control chip comprises a touch timing segment and a display timing segment; and the touch timing segment and the display timing segment are non-overlapping timing segments;

the selection circuit is configured to transmit the touch signal, provided by the control chip, to the isolation structure, which is correspondingly connected to the selection circuit in the touch timing segment, and transmit the power signal, provided by the pixel driving circuit, to the isolation structure, which is correspondingly connected to the selection circuit in the display timing segment.

15. The touch display panel according to claim 14, wherein the selection circuit comprises a first inputting terminal, a second inputting terminal and an outputting terminal, and the control chip is configured to control conduction between the first inputting terminal and the outputting terminal through a control signal line, and to control conduction between the second inputting terminal and the outputting terminal through another control signal line;

in the touch timing segment, the control chip is configured to control conduction between the first inputting terminal and the outputting terminal through a first control signal line, and provide the touch signal through a first connection line;

in the display timing segment, the control chip is configured to control conduction between the second inputting terminal and the outputting terminal through a second control signal line, and provide the power signal through a second connection line;

the first inputting terminal is connected to the control chip through the first connection line, and the touch signal is provided by the control chip; the second inputting terminal is connected to the pixel driving circuit through the second connection line, and the power signal is provided by the pixel driving circuit; and the outputting terminal is connected to the isolation structure which is correspondingly connected to the selection circuit;

the control chip is configured to provide the touch signal through the first connection line in the touch timing segment; and the pixel driving circuit is configured to provide the power signal through the second connection line in the display timing segment; and the selection circuit is configured to conduct the first inputting terminal and the outputting terminal in the touch timing segment, to output the touch signal to the corresponding isolation structure through the outputting terminal, and is configured to conduct the second inputting terminal and the outputting terminal in the display timing segment, to output the power supply signal to the corresponding isolation structure through the outputting terminal.

16. The touch display panel according to claim 13, wherein a frame of image of the touch display panel comprises a display time period and a black frame insertion time period; and the display timing segment comprises the display time period, the touch timing segment comprises the black frame insertion time period, and a duration of the display time period is longer than a duration of the black frame insertion time period.

17. A touch display panel, comprising:

a substrate;

a light-emitting layer, provided on a side of the substrate and comprising a plurality of light-emitting units, wherein the light-emitting unit comprises a first electrode located on a side facing away from the substrate;

a plurality of isolation structures, provided on a side of the substrate with intervals, wherein the plurality of isolation structures are configured to define a plurality of isolation openings, a light-emitting unit is provided in an isolation opening, adjacent light-emitting units are isolated by an isolation structure, and the first electrode is electrically connected to the isolation structure;

a time-sharing control module, electrically connected to corresponding isolation structures, wherein the time-sharing control module is configured to control a corresponding isolation structure to receive a touch signal or a power signal in a time division mode; and an insulating layer located between the isolation structure and the substrate, wherein the insulating layer is provided with a plurality of pixel openings, a pixel opening is communicated with the isolation opening, and the isolation structure is located on a side, facing away from the substrate, of the insulating layer;

wherein the isolation structure comprises a blocking portion located on a side of a substrate and a supporting portion located on a side, facing away from the substrate, of the blocking portion; and the blocking portion is an insulating structure, the supporting portion is a conductive structure, and a side edge of the first electrode is in contact with the supporting portion.

* * * * *